Dec. 15, 1959    F. F. MILLER, JR    2,916,896
UNIVERSAL JOINT
Filed June 25, 1957
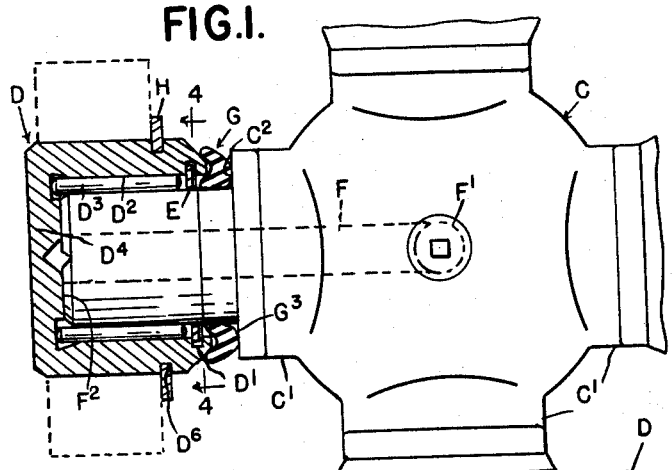
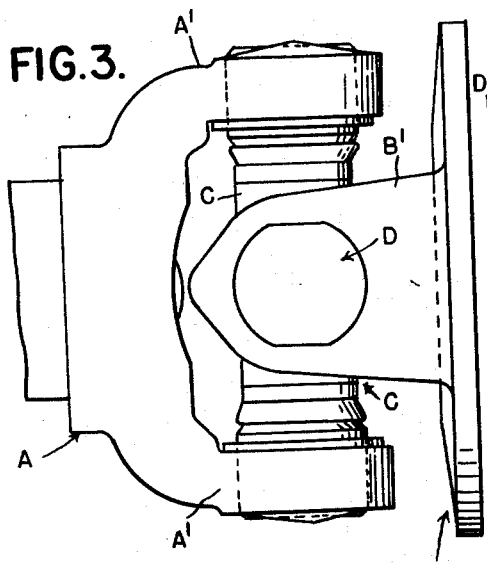
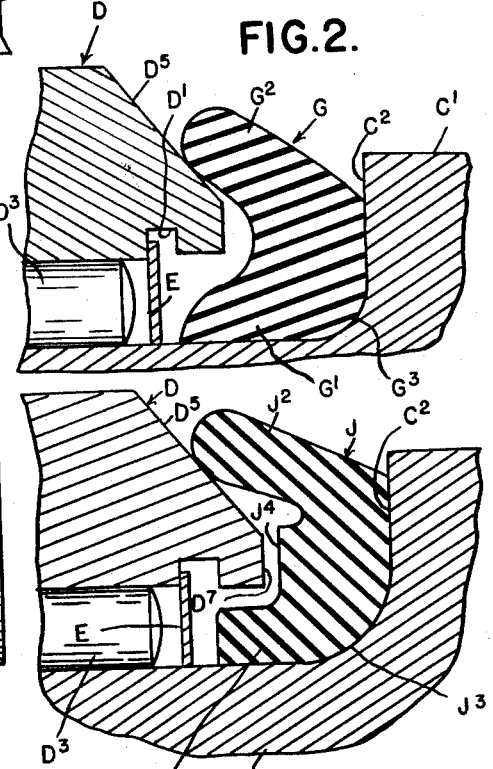
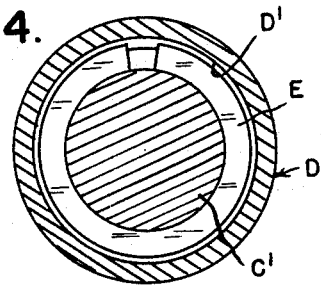
INVENTOR.
FRED F. MILLER JR.
BY
Whittemore, Hulbert & Belknap
ATTORNEYS

United States Patent Office 2,916,896
Patented Dec. 15, 1959

2,916,896
UNIVERSAL JOINT

Fred F. Miller, Jr., Berkley, Mich., assignor, by mesne assignments, to Dana Corporation, Toledo, Ohio, a corporation of Virginia Application June 25, 1957, Serial No. 667,844

4 Claims. (Cl. 64—17)

The invention relates to universal joints of that type in which the rotary members are connected by bifurcations thereon embracing and pivotally connected in transverse planes to a cross trunnion member.

Usually there are separate roller bearings for forming each of the pivotal connections and these are usually cup shaped to fit over the ends of the trunnions and externally engage apertures in the furcations. A sealing ring surrounds the trunnion at the inner end of the cup to retain the lubricant therein and to protect entry of dirt or other matter from the outside.

It is an object of the invention to provide a sealing means for the bearings which effectively prevents entrance thereinto of foreign matter without preventing outward passage of displaced air and the old lubricant during pressure lubrication.

Another object of the invention is to provide a sealing means which is held against outward movement by centrifugal force and thereby protected against injury through rubbing engagement with adjacent parts of the joint.

Other objects and features of the invention will become apparent as the description proceeds, especially when taken in conjunction with the accompanying drawing illustrating preferred embodiments of the invention, wherein:

Fig. 1 is an elevation of the cross trunnion member detached from the rotary members but with the cupped roller bearings engaged with and secured to the trunnions, parts of the structure being broken away and one of the bearings being in section.

Fig. 2 is an enlarged view of a portion of Fig. 1.

Fig. 3 is a side elevation of the assembled universal joint.

Fig. 4 is a section taken on the line 4—4 of Fig. 1.

Fig. 5 is similar to Fig. 2 illustrating a modification.

As shown in Fig. 3, A and B are rotary members having bifurcated portions A′ and B′ for engagement with a cross trunnion member C, the construction being generally the same as heretofore manufactured and used. Each of the separate trunnions C′ of the trunnion member C has engaged therewith a cupped roller bearing member D, preferably the so-called needle bearing. These bearings when the joint is assembled engage apertures in the furcations A′ and B′ to which they are secured. In the assembled joint each bearing is engaged with an aperture in one of the furcations, but during assembly the cross trunnion member is first engaged with said apertures, after which the bearings are introduced from outside the furcations and secured in such position.

Before complete assembly of the joint, the bearing members D are engaged with their respective trunnions of the cross trunnion member and remain in such position during shipment of the parts. It is however necessary to provide some means for holding the bearings in such position. Such means comprises a resilient transversely split snap ring E biased for clamping engagement with the trunnion but which is first assembled with the bearing D by snap engagement with an internal annular groove $D^1$ therein. More in detail the bearing D has an inner annular race surface $D^2$ for externally engaging the needle rollers $D^3$ which latter extend from the closed end $D^4$ of the cup to near the inner open end thereof. The groove $D^1$ is located slightly beyond the inner ends of the rollers and is large enough in cross section not to bind upon the snap ring E. However, this ring E will be clamped upon the trunnion $C^1$ with sufficient friction to hold the bearing D thereon when detached from the furcation of the member A or B. The snap ring also serves to hold the rollers in the bearing cup when the cup is disengaged from bearing trunnion $C^1$ of cross member C. This construction does not increase the manufacturing cost of the bearing while the cost of the snap ring is negligible.

The sealing means of my invention is provided for excluding entrance of any foreign matter into the bearing and for retaining the lubricant therein. The lubricant is introduced into each bearing through a channel F through the axis of the trunnion communicating at its inner end with a common channel $F^1$ for all the trunnions which extends axially of the member C. From the channel F the lubricant passes through radial channels $F^2$ at the end of the trunnions into the space occupied by the rollers $D^3$. It is, therefore, necessary that the sealing means at the inner ends of the rollers should permit of displacement of air and old lubricant by the new lubricant without destroying their sealing characteristic against entrance of any material from the outside. It must also be remembered that when the joint is in action the sealing means must resist displacement by centrifugal force or any other disturbing stresses. My improved sealing means comprises an endless ring G formed of a resilient plastic, such as Neoprene, which snugly fits over the trunnion $C^1$ and bears against a shoulder $C^2$ thereon. In cross section the ring is U-shaped with annular portions $G^1$ and $G^2$, respectively, extending inside and outside the inner end of the cupped bearing D. The latter is tapered at its inner end to form the conical outer surface $D^5$ over and against which the portion $G^2$ of the ring is pressed. In fact, this portion $G^2$ is displaced by the surface $D^5$ in the assembled position of the parts and is thus biased to press against said surface. The inner portion $G^1$ extends into fairly close proximity to the ring E, while the outer surface of the U, $G^3$, bears against a correspondingly shaped surface of the shoulder $C^2$. With such construction sealing against entrance of material from the outside will be maintained in spite of centrifugal force or other stresses. However, when the joint is lubricated, as previously described, a small quantity of the lubricant may pass outward by the portion $G^2$, thus indicating that the lubrication is complete.

When the joint is in use the friction of the ring E on the trunnion is not sufficient to be relied upon in holding the bearing D from displacement. Any suitable means may be used for this purpose but, as shown, each bearing D is formed with an annular groove $D^6$ in the portion of its outer surface which extends inside of the furcation A′ or B′. A snap ring H is engaged with this groove and forms a shoulder for bearing against the furcation, thereby preventing outward movement of the bearing on the trunnion.

Fig. 5 illustrates a modified sealing means which comprises an endless ring J likewise formed of a resilient plastic, such as Neoprene, which snugly fits over each trunnion C′ and bears against the shoulder $C^2$ thereon. In cross section the ring is U-shaped with annular portions J′ and $J^2$, respectively, extending inside and outside the inner end of the associated cupped bearing D. The cupped bearing D is the same as in the first embodiment and the portion J² of the ring is displaced by the surface D⁵ of the bearing in the assembled position of the parts and is thus biased to press against said surface. The inner portion J' extends into fairly close proximity to the ring E, while the outer surface of the U, J³, bears against a correspondingly shaped surface of the shoulder C². As with the first embodiment, this sealing ring seals against entrance of material from the outside in spite of centrifugal force or other stresses. The joint may be lubricated in the same way as in the first embodiment.

The ring J differs from the ring G essentially in that the ring J has a raised annular land or shoulder J⁴ between the portions J' and J² which extends into close proximity to the annular inner end D⁷ of the bearing. The space between the shoulder J⁴ and the bearing surface D⁷ is less than the space between the portion J' and the ring E. The sealing ring J will tend to move outwardly along the associated trunnion C' by centrifugal force and the inner end surface D⁷ of the bearing will positively limit such outward movement of the sealing ring by engagement with the shoulder J⁴. The sealing ring J is thus positively prevented from moving outwardly along its trunnion far enough for engagement of the portion J' with the ring E. This is desirable in that it precludes injury to the portion J' of the sealing ring by rubbing engagement with the snap ring E. The normal oscillating movement of the bearing D may be transmitted to the snap ring E which it frictionally engages so that if the sealing ring engages the snap ring, particularly at the split in the snap ring, there would be a rubbing on the portion J' against the sealing ring which might damage the sealing ring and reduce its effectiveness.

What I claim as my invention is:

1. In a universal joint of the cross-trunnion type, a cupped bearing engaging each trunnion, a resilient sealing ring on said trunnion at the inner end of said bearing, said sealing ring having an annular portion surrounding a radially outer surface of said bearing and radially expanded thereby to be thus biased for pressure sealing contact thereagainst, said annular portion being free to further radially expand away from the bearing under internal pressure during pressure lubrication of the joint to permit outward displacement of old lubricant, the remaining portions of said sealing ring being normally clear of and out of contact with said bearing, means for holding said bearing on said trunnion including a split snap ring encircling said trunnion between said bearing and trunnion and located outwardly of said trunnion from said sealing ring, said sealing ring having a portion engageable with the inner end of said bearing to keep said sealing ring from being displaced outwardly by centrifugal force into engagement with said split snap ring.

2. In a universal joint of the cross-trunnion type, a cupped bearing engaging each trunnion, a resilient sealing ring on each trunnion at the inner end of said bearing, said bearing having a radially outer surface at its inner end tapered in an inward direction, said sealing ring having an annular radially outer portion surrounding said radially outer surface of said bearing and radially expanded thereby to be thus biased for pressure sealing contact thereagainst, said annular portion being free to further radially expand away from the bearing under internal pressure during pressure lubrication of the joint to permit outward displacement of old lubricant, the remaining portions of said sealing ring being normally clear of and out of contact with said bearing, means for holding said bearing on said trunnion including a split snap ring encircling said trunnion between said bearing and trunnion and located outwardly of said trunnion from said sealing ring, said sealing ring having a radially inner annular portion fitting said trunnion and extending within said bearing in spaced relation to said snap ring and an annular shoulder between said radially inner and outer annular portions engageable with said inner end of said bearing to keep said sealing ring from being displaced outwardly by centrifugal force far enough for engagement of said radially inner annular portion with said snap ring.

3. In a universal joint of the cross-trunnion type, a cupped bearing engaging each trunnion, a resilient sealing ring on each trunnion at the inner end of said bearing, said bearing having a radially outer surface at its inner end tapered toward said sealing ring in an inward direction, said sealing ring having an annular radially outer portion surrounding said tapered radially outer surface of said bearing and radially expanded thereby to be thus biased for yielding pressure sealing contact thereagainst, said annular portion being free to further radially expand away from the bearing under internal pressure during pressure lubrication of the joint to permit outward displacement of old lubricant, the remaining portions of said sealing ring being normally clear of and out of contact with said bearing, said annular portion being adapted to bear with greater pressure against said tapered radially outer surface in response to relative movement of said sealing ring and bearing toward one another to increase the seal.

4. In a universal joint of the cross-trunnion type, a cupped bearing engaging each trunnion, a resilient sealing ring on said trunnion at the inner end of said bearing, said sealing ring having an annular portion surrounding a radially outer surface of said bearing and radially expanded thereby to be thus biased for pressure sealing contact thereagainst, means for holding said bearing on said trunnion including a split snap ring encircling said trunnion between said bearing and trunnion and located outwardly of said trunnion from said sealing ring, said sealing ring having a portion engageable with the inner end of said bearing to keep said sealing ring from being displaced outwardly by centrifugal force into engagement with said split snap ring.

References Cited in the file of this patent
UNITED STATES PATENTS

| | | |
|---|---|---|
| 2,773,367 | Slaght | Dec. 11, 1956 |
| 2,773,368 | Slaght | Dec. 11, 1956 |